United States Patent [19]

Ohsawa

[11] Patent Number: 4,833,494
[45] Date of Patent: May 23, 1989

[54] SINGLE LENS REFLEX CAMERA HAVING REPLACEABLE VIEW FINDER

[75] Inventor: Keiji Ohsawa, Yokohama, Japan
[73] Assignee: Nikon Corporation, Tokyo, Japan
[21] Appl. No.: 167,148
[22] Filed: Mar. 11, 1988
[30] Foreign Application Priority Data
Mar. 16, 1987 [JP] Japan .................................. 62-38138
[51] Int. Cl.⁴ ...................... G03B 13/06; G03B 17/20; G03B 19/12
[52] U.S. Cl. .................................... 354/152; 354/219; 354/289.1
[58] Field of Search ...................... 354/152, 219, 289.1
[56] References Cited
U.S. PATENT DOCUMENTS
3,967,299  6/1976  Shono ................................ 354/219
4,165,933  8/1979  Seimouchi et al. ............. 354/152 X FOREIGN PATENT DOCUMENTS
57-135934  8/1982  Japan .

Primary Examiner—Michael L. Gellner
Attorney, Agent, or Firm—Shapiro and Shapiro

[57] ABSTRACT

A single lens reflex camera having a replaceable view finder unit, wherein it includes an electric circuit therein, said electric circuit capable of being connected to an electric circuit in a camera body through the medium of contact means is characterized in that the replaceable view finder unit includes a housing into which at least a pentagonal roof prism and an eye piece portion are arranged, and a signal contact of a contact means for electrically connecting the electric circuit in the view finder unit to the electric circuit in the camera body is arranged on a bottom of the housing below the eye piece portion.

7 Claims, 2 Drawing Sheets

SINGLE LENS REFLEX CAMERA HAVING REPLACEABLE VIEW FINDER

BACKGROUND OF THE INVENTION

1. Field of the Invention

The present invention relates to a single lens reflex camera having a replaceable view finder, and, more particularly, it relates to a single lens reflex camera having a replaceable view finder wherein a view finer unit includes an electric circui therein, which electric circuit can be connected to an electric circuit arranged in a body of the camera through contact means.

2. Related Background Art

Various single lens reflex cameras wherein a view finder can be replaced by another one according to its purpose of usage have been put to practical uses, and such cameras having a replaceable view finder including an electric circuit therein have also been proposed. In these conventional single lens reflex cameras, for example, in the case where a light receiving element for the TTL light measurement is arranged in a finder, as disclosed in the U.S. Pat. No. 3,967,299, as well as in the case where an accessory shoe with a synchronizing contact is provided in a replaceable view finder, as disclosed in the Japanese Patent laid-Open No. 57-135934, it is required to provide an electric contact for the signal transmission between the camera body and the finder so that the electric circuit in the replaceable finder can be electrically connected to the electric circuit in the camera body when the finder is mounted on the camera body.

In the above Japanese Patent Laid-Open No. 57-135934 and the above U.S. Pat. No. 3,967,299, as shown in FIG. 3, electric contact members 3a and 3b were arranged in a space between a third reflection surface 1a of a pentagonal roof prism (pentaprism) 1 and a camera body 2. This arrangement is effective to obtain the electric connection between the camera body and the view finder unit, both when the view finder unit is mounted on the camera body 2 by dropping or lowering the finder unit on a mount portion of the camera body and when the finder unit is mounted on the camera body by sliding the finder unit forwardly on the camera body.

However, the position (in the camera body) where such contact member is arranged must be applied to various important uses, as for example, the use for arrangement of an indicator for providing an indication compartment in a view field in the finder. More particularly, there is no problem when only the contact member is arranged in such position; however, when a plurality of contact members are required as described in the above U.S. Pat. No. 3,967,299, if all of the contact members are arranged in such position, there arises a problem that a position where the indicator is to be arranged is considerably limited or restricted.

Further, there has been provided a single lens reflex camera wherein, as shown in FIG. 4, a pair of contact mechanisms 4a and 4b were arranged on the camera body 2 outwardly (rightwardly and leftwardly) beyond the both sides of the pentagonal roof prism 1 to permit the electric connection between an exposure meter in the view finder unit and a power battery in the camera body. This system is particularly applicable in the case where the view finder unit is mounted on the camera body by dropping the former on the latter, and is advantageous in the point that the number of contacts to be arranged can be increased since both sides of the pentaprism 1 are available and since plurality of contacts can be arranged on each side of the pentaprism in parallel to the side surface of the pentaprism (i.e., in parallel to an optical axis of the lens).

However, in this case, there arises a problem that a transverse width of the view finder unit must naturally be lengthened to permit the arrangement of the contact members thereon in correspondence to the associated contact members arranged on the camera body 2 and situated outwardly of the pentaprism.

SUMMARY OF THE INVENTION

Accordingly, an object of the present invention is to solve the above-mentioned problems of the prior art and to provide a single lens reflex camera having a replaceable view finder unit, wherein the front space in front of the pentagonal roof prism is available for other purpose than the arrangement of electric contacts, the unit can be compact, and the electric contacts can be arranged in a reasonable position.

In order to achieve the above object, according to the present invention, there is provided a single lens reflex camera having a replaceable view finder unit, wherein it includes an electric circuit therein, said electric circuit capable of being connected to an electric circuit in a camera body through the medium of contact means, and characterized in that the replaceable view finder unit includes a housing into which at least a pentagonal roof prism and an eye piece portion are arranged, and a signal contact of a contact means for electrically connecting the electric circuit in the view finder unit to the electric circuit in the camera body is arranged on a bottom of the housing below the eye piece portion.

In the present invention, when the replaceable view finder unit is mounted on an upper portion of the camera body, the electric circuit in the view finder unit is electrically connected to the electric circuit in the camera body through the signal contact of the contact means arranged on the bottom of the housing below the eye piece portion situated rearwardly of the pentagonal roof prism.

Thus, in the present invention, since the electric contact of the contact means is arranged in the space below the eye piece (which space was not utilized in the prior art), which space is already pre-defined by optical factors such as positions and sizes of the pentaprism and th eye piece, an additional space for arranging the contact means is not reserved in the camera body or in the view finder unit, thus preventing enlargement of the camera body and finder unit.

Further, in the present invention, since the space in front of the pentaprism is not occupied by the contact mean such space can be effectively utilized for arranging other mechanisms such as an optical indicator for providing an indication compartment in a view field in the finder, thus putting the space to practical use. In addition, since there exists wider space adjacent to the camera lens and along the width of the pentaprism, a relatively large number of electric contacts can be arranged therein.

The present invention will be apparent from the following explanation with reference to the attached drawings.

BRIEF DESCRIPTION OF THE DRAWINGS

FIGS. 3 and 4 show prior arts, wherein FIG. 3 is a partial sectional view showing contact means when the finder is mounted on the camera, and FIG. 4 is a top view of a mount portion of another camera.

DESCRIPTION OF THE PREFERRED EMBODIMENTS

There are two methods for mounting a replaceable view finder unit on a camera body; one is a "dropping" method wherein the finder unit is mounted on the camera by dropping or lowering the finder unit onto the mount portion of the camera, and the other is a "sliding" method wherein the finder unit is mounted on the camera by sliding the finder unit forwardly from a rear side of the camera. The present invention is applicable to any view finder units to be mounted either by "dropping" method or by "sliding" method.

Figure 1:
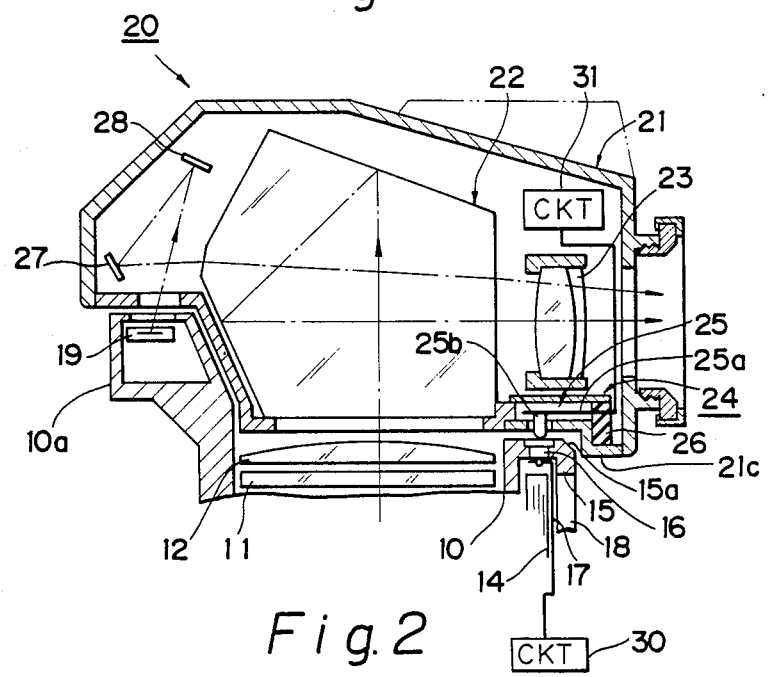
FIG. 1 is a longitudinal sectional view of a replaceable view finder unit and an associated portion of a single lens reflex camera according to an embodiment of the present invention.
Figure 2:
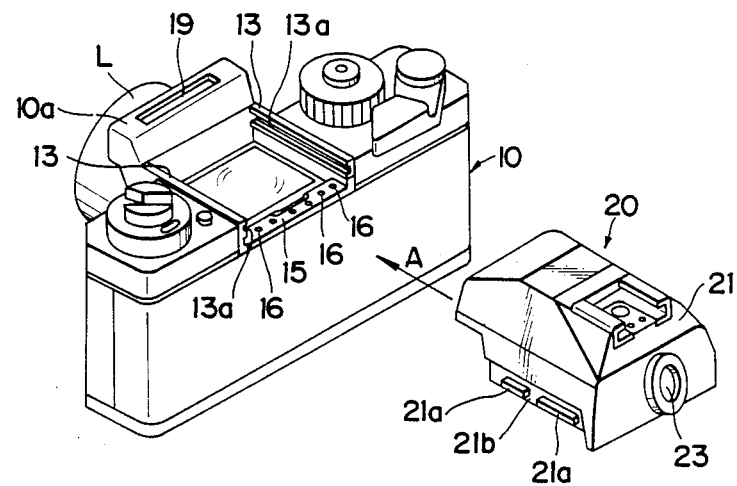
FIG. 2 is a perspective view showing the view finder unit of FIG. 1 and the single lens reflex camera on which the view finder unit is mounted.
Figure 3:
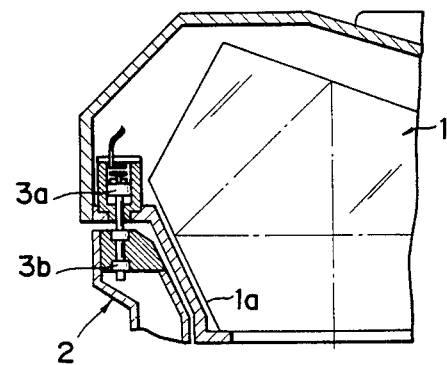
Figure 4:
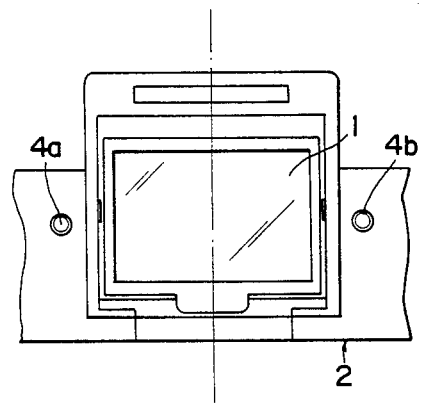

An embodiment shown in FIGS. 1 and 2 includes the combination of a camera and a replaceable view finder unit, for example, of the "sliding" method type.

A camera lens L is arranged on a front part of a camera body 10, and a replaceable view finder unit 20 can be mounted on a mount portion formed in an upper portion of the camera body 10.

The camera body 10 includes a ground-glass or focusing screen 11 and a condenser lens 12 which can be optically connected to the view finder unit 20. A pair of rails 13 are formed on the mount portion above the condenser lens 112 as shown in FIG. 2. Further, a focal-plane shutter 14 is also arranged on a rear part of the camera body 10.

The view finder unit 20 comprises a housing 21 into which a pentagonal roof prism 22 and an eye piece 23 are arranged. A pair of longitudinal projections 21a (only one of which is shown in FIG. 2) are provided on both sides of the lower portion of the housing 21; one of the projections 21a (FIG. 2) is provided, at its intermediate portion, with a locking recess 21b. The position and/or size of the pentagonal roof prism 22 and the eye piece 23 are determined by optical factors, for example, such as finder magnification, finder recording ratio, length of eye point and the like.

Each rail 13 is provided with a longitudinal rail recess 13a for receiving the corresponding projection 21a formed on the finder unit 20. One of the rail recesses 13a is provided, at its intermediate portion, with a locking pawl (not shown) for engaging the corresponding locking recess 21b formed in the projection 21a.

Behind the pentagonal roof prism 22 in the finder unit 20, between the eye piece 2 and the focal-plane shutter 14 of the camera body 10 (that is to say, in a space in the housing 21 below the eye piece 23) a contact device 24 is arranged in a manner fully described hereinafter.

In face of the contact device 24, on the camera body 10, there is arranged a contact block 15 which forms a part of outer surfaces of the camera body 10 and which is made of electrically-insulating material such as plastic material, and on which a plurality of fixed contacts 16 are fixed or embedded.

An upper surface of each fixed contact 16 is substantially the same level as an upper surface of the contact block 15, as shown in FIG. 1. The contact block 15 has an inclined guide surface 15a at its upper rear corner.

When there are many contacts, it is effective to use a flexible printed board 17 for effecting the electrical connection of the fixed contacts 16. If there are a few contacts, electric codes or wires directly connected to the contacts may be used. The flexible printed board 17 extends through a space between the focal-plane shutter 14 and a rear outer wall 18 (having a film aperture) of the camera body 10 and is connected to an electric circuit 30 arranged in the camera body 10.

The contact device 24 arranged on the view finder unit 20 comprises a plurality of movable contacts 25 each including a leaf spring 25a and a contact pin 25b formed on the free end of the leaf spring, and a contact block 26 which supports the movable contacts and which is made of electrically-insulating material such as plastic material. The contact block 26 is fixedly supported by a bottom wall 21c of the housing 21 in such a manner that each of the movable contacts 25 is aligned with the corresponding fixed-contact 16 on the contact block 15 of the camera body 10.

In the case of 35 mm single lens reflex camera, since the width of the pentagonal roof prism 22 is about 36 mm and the width of the eye piece 23 is about 20 mm at most even if the finder recording ratio is 100%, there are wider spaces on both sides of the eye piece 23 positioned in the center with respect to the width of the finder unit. Accordingly, by utilizing these spaces, the electrical connection between the movable contacts 25 and an electric circuit 31 arranged in the view finder unit 20 can be easily effected through the medium of a flexible printed board, codes, wires or the like.

In front of and adjacent to a third reflection surface of the pentagonal roof prism 22 of the view finder unit 20, the camera body 10 has a projecting portion 10a for holding an indicator 19 which indicates aperture value, shutter speed and the like. Mirrors 27 and 28 for sending an image from the indicator 19 to the eye piece 23 are provided at the front part in the housing 21 of the view finder unit 20.

When the view finder unit 20 is desired to be mounted on the camera body 20, the view finder unit 20 is shifted in a direction shown by an arrow A (FIG. 2) to insert the longitudinal projections 21a on the housing 21 of the view finder unit 20 into the corresponding rail recesses 13a in the rails 13 of the camera body 10. When the view finder unit 20 reaches a predetermined position on the camera body 20, the spring-biased locking pawl (not shown) in the rail recess 13a enters into the locking recess 21b in the projection 21a, thereby locking the view finder unit 20 on the camera body 10. In this condition, an image of an object formed on the focusing screen 11 can be observed by an operator through the condenser lens 12, pentagonal roof prism 22 and eye piece 23; at the same time the operator can obtain the information on the indicator 19 through the mirrors 28, 27, pentagonal roof prism 22 and eye piece 23.

When the view finder unit 20 is mounted on the camera body 10, the contact pins 25a of the movable contacts 25 of the finder unit 20 climb over the inclined guide surface 15a of the contact block 15 of the camera body 10; when the finder unit 20 is locked on the camera body 10 by engaging the locking pawl (not shown) by the locking recess 21b, the contact pins 25b contact or engage with the corresponding fixed contacts 16 in the camera body 10. In this case, the contacting pressure between the contact pin 25b and the fixed contact 16 is determined by a spring force of the leaf spring 25a. In this connection, it is further effective to pre-bias the contact pins 25b by means of the leaf spring 25a in such a manner that each of the contact pins protrudes at an appropriate amount downwardly from the bottom of the housing 21 in the non-mounted condition.

When the view finder unit 20 is desired to be removed from the camera body 10, by disengaging the locking pawl (not shown) from the locking recess 21b by means of an appropriate finder unlocking lever (not shown), the view finder unit 20 can easily be slid off from the camera body 10 by shifting the unit 20 rearwardly.

In the embodiment shown in FIG. 1, although the information such as aperture value, shutter speed and the like from the indicator 19 of the camera body 10 is transmitted to the operator through the mirrors 28, 27, pentagonal roof prism 22 and eye piece 23, it may be constructed that such information is directly observed by the operator.

As mentioned above, according to the present invention, since the contact device is arranged in the space (in the view finder unit) which had not been utilized in the conventional cameras, the view field in the finder is not obstructed at all, the whole size of the camera body and/or the view finder unit is not increased, and the electrical connection between the electric circuit in the camera body and the electric circuit in the view finder unit can be effective achieved.

What is claimed is:

1. A single lens reflex camera, comprising:
    a camera body for supporting a camera lens, said camera body including a first electric circuit therein;
    a view finder unit comprising a housing, a pentagonal roof prism, an eye piece and a second electric circuit therein said housing being removably mounted on said camera body, said pentagonal roof prism being disposed in said housing;
    first electric connector means connected to said first electric circuit and arranged on an upper surface of a rear portion of said camera body below the eye piece; and
    second electric connector means connected to said second electric circuit and arranged on a bottom of said housing below said eye piece to engage by said first electric connector means, said second electric connector means being disengaged from said first electric connector means when said view finder unit is removed from said camera body.

2. A single lens reflex camera as set forth in claim 1, wherein said first electric connector means includes a plurality of first contacts electrically insulated from each other and fixed on the upper surface of said camera body, said second electric connector means including a plurality of second contacts electrically insulated from each other and biased to engage by the corresponding first contacts.

3. A single lens reflex camera as set forth in claim 1, wherein said camera body further includes a projecting portion protruding into a space adjacent to a forwardly inclined third reflection surface of said pentagonal roof prism and an indicator held by said projecting portion, said view finder unit further including reflection members, arranged in a space in front of said pentagonal roof prism, for directing an image on said indicator to said eye piece through said pentagonal roof prism.

4. A single lens reflex camera as set forth in claim 1, wherein said camera body further comprises a focal-plane shutter covering a front face of a film aperture formed in the camera body, said first electric connector means being fixed on the upper surface of the camera body above said focal-plane shutter.

5. A single lens reflex camera as set forth in claim 3, wherein said housing of said view finder unit is formed to protrude forwardly of said pentagonal roof prism so as to overhang above said projecting portion of said camera body, said reflection members for directing the image on said indicator being arranged in the space in the overhanging portion of said housing.

6. A single lens reflex camera, comprising:
    a camera body surrounded by an outer wall member including a front wall supporting a camera lens and arranged substantially perpendicular to an optical axis of said lens, a rear wall arranged in opposed to and in parallel with said front wall, and an upper wall connecting between said front and rear walls, said upper wall having a rectangular light passing window for emitting light flux entered into the camera body out of said camera body;
    a view finder unit including a housing, and a finder optical system arranged in said housing;
    coupling means for coupling said view finder unit to said camera body, said coupling means including a pair of guide members arranged on both sides of said light passing window and extending in substantially parallel with said optical axis, and engaging members provided on said housing and engaging by said guide members, said view finder unit being coupled to said camera body by sliding the view finder unit in a direction parallel to said optical axis from said rear wall toward said front wall up to align said finder optical system with said light passing window; and
    electric connecting means including a first electric connector provided on said camera body between said rear wall and said light passing window, and a second electric connector provided on said housing of the view finder unit in such a manner that when the view finder unit is coupled to said camera body by said coupling means said second electric connector is connected to said first electric connector.

7. A single lens reflex camera as set forth in claim 6, wherein said first electric connector is arranged on said upper wall adjacent to said light passing window.

* * * * *